Jan. 11, 1927.  
C. H. DRAPER  
1,613,651  
HARNESS MECHANISM FOR LOOMS  
Filed April 10, 1925   2 Sheets-Sheet 1

Witness:  
Alfred H. McGlinchey

Inventor:  
Clare H Draper  
by his attorneys  
Van Everen Fish Hildreth & Kenny

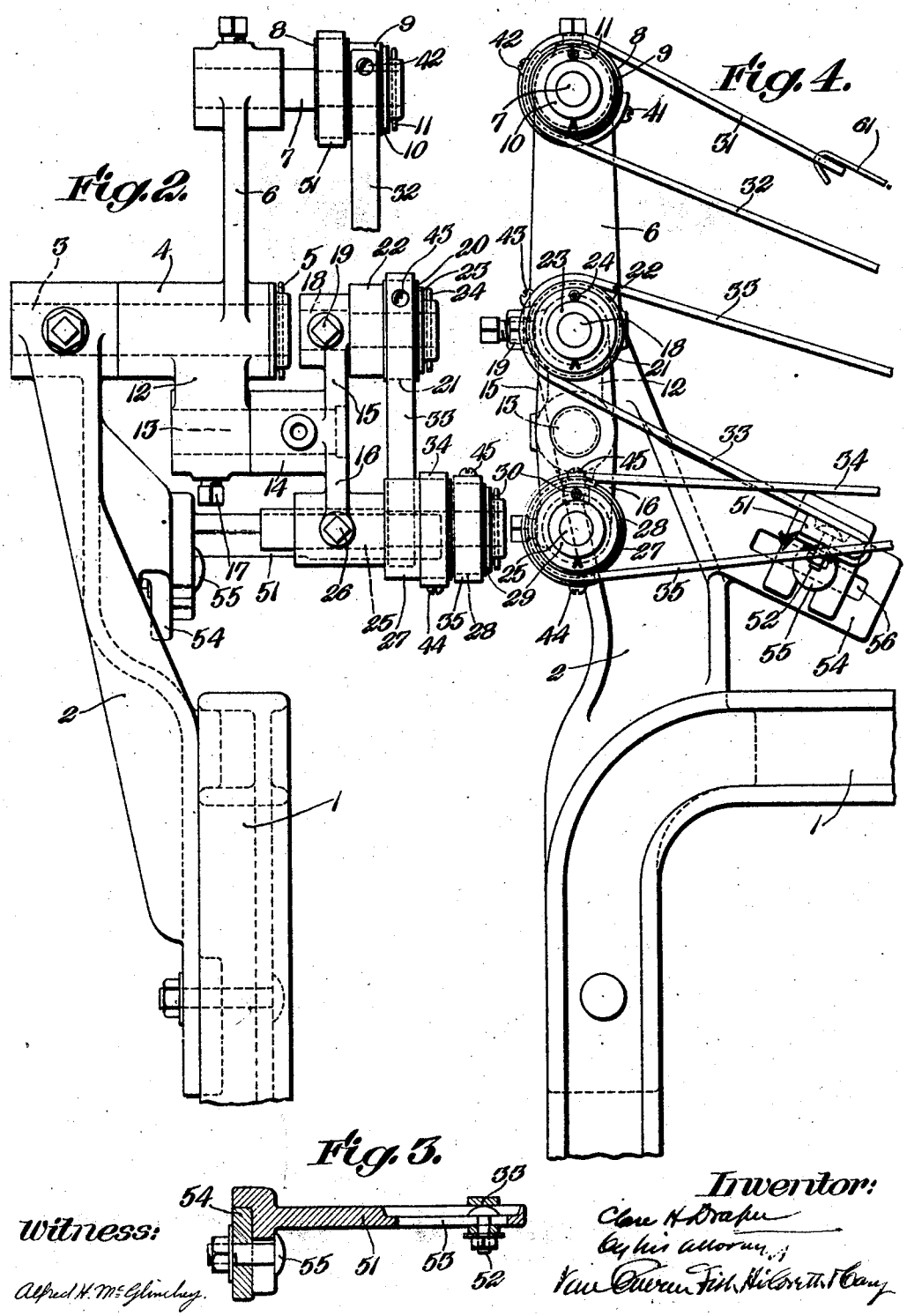

Patented Jan. 11, 1927.

1,613,651

UNITED STATES PATENT OFFICE.

CLARE H. DRAPER, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

HARNESS MECHANISM FOR LOOMS.

Application filed April 10, 1925. Serial No. 22,094.

The present invention relates to an improvement in harness mechanism for looms and more particularly that part of the harness mechanism for looms by which the harness is supported from the loom frame.

The object of the invention is to reorganize and improve the construction of harness mechanisms, and to this end the invention consists in the harness mechanism hereinafter described and particularly defined in the claims.

In the accompanying drawings illustrating the preferred form of the invention, Fig. 1 is a front elevation of a portion of the loom illustrating the harness supporting mechanism; Fig. 2 is a side elevation of the harness mechanism; Fig. 3 is a detail hereinafter referred to; and Figs. 4, 5 and 6 illustrate different positions of the mechanism corresponding to different positions of the harnesses.

The illustrated embodiment of the invention is described as follows: The arch 1 of the loom frame supports a bracket 2 which extends upwardly from the left-hand end of the arch. In the upper end of this bracket the main stud 3 is secured. This main stud carries the main lever 4 pivotally mounted on the stud, being held thereon by means of a cotter pin 5. The upper arm 6 of the main lever carries a sheave stud 7 secured to the arm 6. On this stud are rotatably mounted the sheave or strap pulleys 8 and 9. The pulleys are integral and held on the stud 7 by a collar 10 and a cotter pin 11. The stud 7 is longer than the length of the sheaves 8 and 9 for a purpose hereinafter referred to. The other end or arm 12 of the main lever 4 carries a stud 13. Upon this stud is pivotally mounted the secondary lever 14 which is provided with two arms. The upper arm 15 extends upwardly and the lower arm extends downwardly from the pivoted stud 13. The stud 13 is headed, and the head is received in a recess in the nave or hub of the lever 14 and is secured in place in the lower arm 12 of the main lever by means of a set screw 17. The upper arm 15 of the auxiliary lever 14 carries a stud 18 secured therein by means of the set screw 19. This stud 18 carries a sheave 20 having two strap faces thereon, one strap face 21 being the larger, the other strap face 22 being slightly smaller. This sheave 20 is secured on the stud 18 by means of a collar 23 and a cotter pin 24. The lower arm 16 of the auxiliary lever 14 carries a stud 25 secured in the arm by means of the set screw 26. This stud 25 carries the sheaves 27 and 28, being held in place on the stud 25 by means of the washer 29 and cotter pin 30.

This motion is particularly designed for use in five-harness weaving, as, for example, in weaving sateen, wherein only one harness is raised at a time, the other four harnesses remaining in lowered position, but it is constructed so that it is also available for use with any number of harnesses from 2 to 6, and, as well, where the same number of harnesses are raised as are lowered. The construction will first be described in which only one harness is raised at a time. The harness straps are attached to the sheaves or the strap pulleys in the usual manner. Thus the strap 31 extends around the pulley 8 and is secured thereto by means of the screw 41. The strap 32 extends around the pulley 9 and is attached thereto by the screw 42. The strap 33 extends around the sheave 20, is attached thereto by the screw 43, and thence extends to the bracket 51 to which it is clamped by the bolt 52. This bolt is mounted in a slot 53 for a purpose which will be hereinafter referred to, and the bracket 51 is bolted to the arm 54 by the bolt 55, which arm 54 projects from the side of the bracket 2. The arm 54 is provided with a slot 56 for the purpose of permitting adjustment of the position of the end of the strap 33. The belt 34 extends around the sheave 27 and is secured thereto by the screw 44. The belt 35 extends around the sheave 28 and is secured thereto by the screw 45. The belt 31 is provided with a hook 61 which extends to two harness straps 62 and 63 running to the opposite ends of the harness frame carried thereby. The belt 32 is connected by means of the hook 71 to the harness straps 72 and 73. The strap 33 is connected by the hook 81 to the straps 82 and 83. The strap 34 is connected by means of the hook 91 to the straps 92 and 93. The strap 35 is connected by means of the hook 101 with the straps 102 and 103. The straps 82, 92 and 102 are connected by means of the hook 110 and 111 and a third hook (not bearing a reference character) respectively to the straps 112, 113 and another strap. The several straps 62, 72, 112, 113 and one other strap pass over the guide sheaves 120 to the harnesses 130, and the straps 63, 73, 83, 93 and 103 pass over the pulleys 121 to the other end of the harnesses 130. The guide pulleys 120 and 121 are supported on pins carried by brackets which are bolted to the arch 1 of the frame of the loom. The harness frames, five in number, counting from front to rear, are controlled by the straps enumerated in the following order: 35, 34, 33, 32 and 31, when the mechanism is used for operating a five-harness motion. It is to be noted that the strap 33 may be attached to either the strap face 21 (so that the strap will have a longer movement) or to the strap face 22 of the sheave 20 (so that the strap will have a shorter movement) to raise the harness carried thereby a greater or less distance.

When a selvage motion is desired to be used in connection with the five-harness motion a rearrangement of the straps and sheaves may be used and is necessitated where extra wide harnesses are used. This rearrangement is as follows:—The stud 7 is loosened and moved to the left in the upper end of the arm 6 of the main lever and again fastened in place. The sheave 20 is taken off of the stud 18 in the upper end of the auxiliary lever 14 and turned end for end and again secured in place. The end of the strap 33 must now be moved, and to do this the bolt 52 is loosened and it is slid along in the slot 53 in the bracket 51 to a position corresponding to the position which when so reversed the sheave 20 occupies. The strap 34 is removed from the right hand position on the sheave 27 and re-attached at the left hand end of that sheave, so that it is carried on the side next to the arm 16 of the auxiliary lever 14. This arrangement is such that a space between the straps 34 and 35 is provided, so that the selvage motion may occupy the space here shown as occupied by the belt 34.

One feature of the present invention consists in positioning the center of the sheave 20 at the center of the main stud 3, so that oscillations of the main lever about its pivot will not cause any movement of the harness supported by the strap 33. Thus when arranged as a five-harness motion the lifting of the harnesses carried by the straps 31 and 32 may be accompanied by a dropping of the harnesses carried by the straps 34 and 35 without movement of the harness carried by the strap 33; Figs. 1 and 5 illustrate these two positions. This condition of affairs flows from making the arm 15 of the secondary lever 14 of the same length as the arm 12 of the main lever.

It will be noted that the pulley 20 has a second unused portion 22. When it is desired to use the mechanism for a six-harness motion, the sheaves 8 and 9 are pushed to the left (see Fig. 2), and the sheave 20 is turned end for end, and both sheaves are provided with straps. This gives the proper size gradation of sheaves in order to cause the correct relative movement of the harnesses.

The drawings show the parts in Figs. 1 to 4 which correspond to the positions the members occupy when either the fourth or the fifth harness is up, all of the other harnesses being down.

Figure 1:
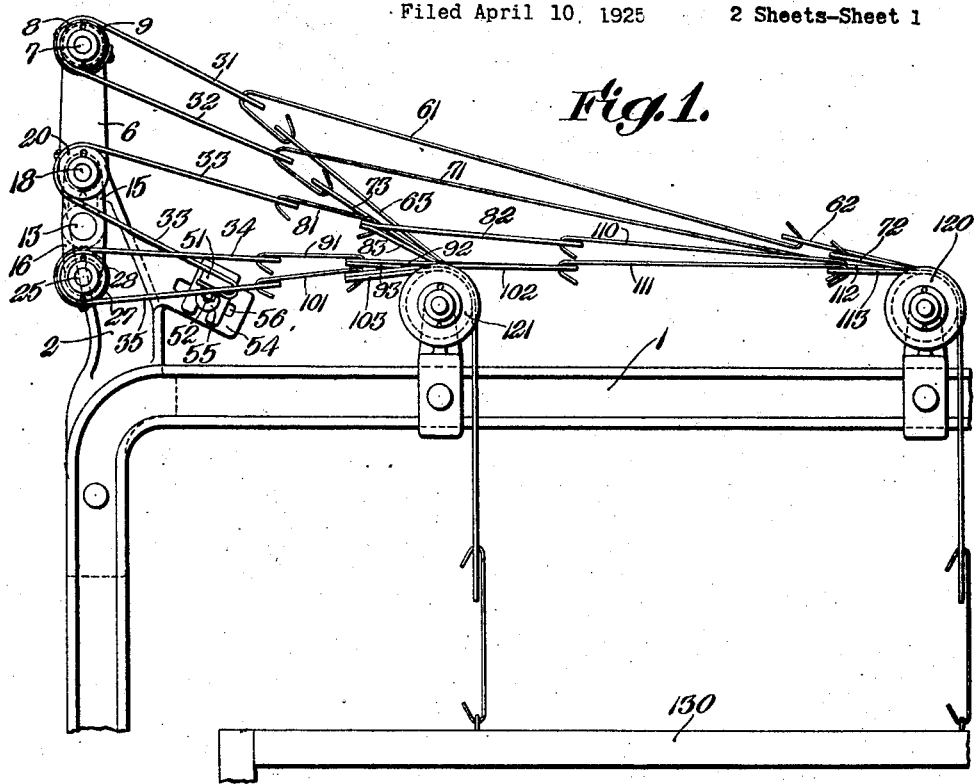
Figures 5, 6:
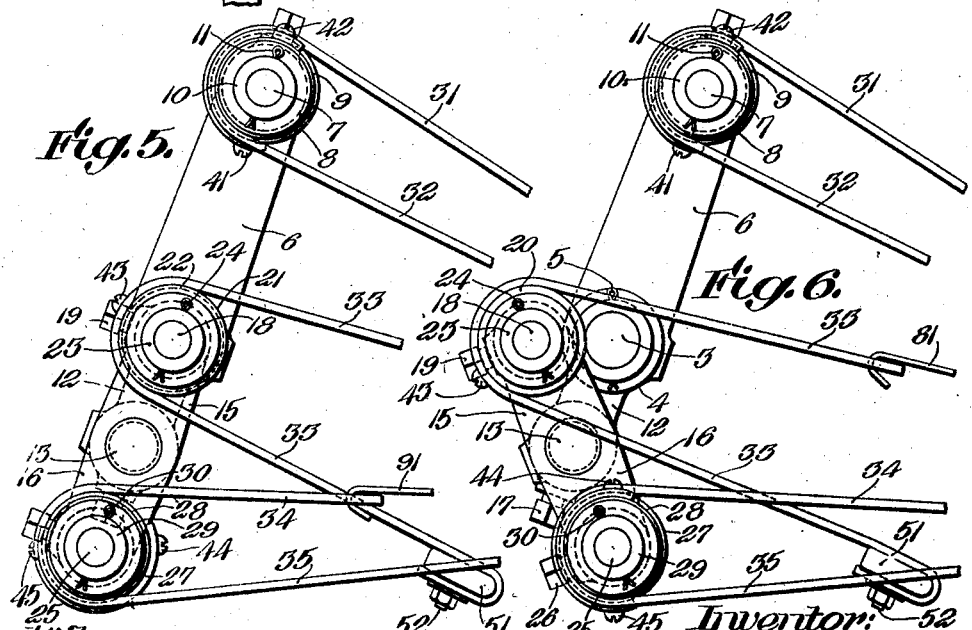
Fig. 5 shows the parts in the positions they occupy when either the first or second harness is raised, that is to say, when either the harness controlled by the strap 35 or that controlled by the strap 34 is raised, at which time all of the other harnesses will be down.
Fig. 6 shows the parts in the positions which they occupy when the third harness is in raised position and all of the other harnesses are lowered.

The mode of use of this type of harness motion is so well known that it is not considered necessary to specifically describe the rearrangement for 2, 3, 4 and 6 harnesses further than to point out that for 2 harnesses the two straps 31, 32 or 33, 33 or 34, 35 or some other combinations might be used; that for 3 harnesses the straps 33, 34 and 35 may be used; that for 4 harnesses the straps 31, 32, 34 and 35 may be used; and that for 6 harnesses all six straps 31, 32, 33, 33, 34 and 35 would be used. The motion will follow the cams perfectly for 2, 3, 4 and 5 harnesses, it will be understood by those skilled in the art; for 6 harnesses it will be satisfactory in operation, but there will be a slight lack of perfect following of the cams. In general the motion is adapted for any weave where the arrangement of harnesses used is one up and five, four, three or two down; it is adapted for any repeating combination.

Having thus described the invention, what is claimed is:

1. A harness mechanism for looms provided with five harnesses having, in combination, a support, a main lever pivotally mounted on the support, one arm of which carries a plurality of harness strap attaching means, and another lever pivotally mounted on the arm of the main lever and carrying a plurality of harness strap attaching means, one of the said harness strap attaching means on the second lever having a harness strap passed over it and attached to a stationary part of the loom.

2. A harness mechanism for looms provided with five harnesses having, in combination, a support, a main lever pivotally mounted on the support, one arm of which carries a pair of sheaves to which a pair of harness straps are attached, another lever pivotally mounted on the other arm of the main lever carrying at one end a pair of sheaves to which a pair of harness straps are attached and a sheave at the other end over which a harness strap is passed, and means for securing the end of said strap to a stationary part of the loom.

3. A harness mechanism for looms provided with an odd number of harnesses having, in combination, a lever system provided with a plurality of double strap attaching means and one single strap engaging means, and means for securing the end of the single strap to a stationary part of the loom.

4. A harness mechanism for looms having, in combination, a support, a main lever pivotally mounted on the support, said main lever having two arms, one of which carries a double sheave supported on the arm so that it may occupy one position adapted for use with a five-heddle harness motion without a selvage harness and another position for a five-heddle motion with a selvage motion, a second lever pivotally mounted on the other arm of the main lever, said second lever being provided with two arms on one of which are supported two sheaves or harness strap pulleys, one of which is strap width and the other of which is double strap width, the latter being adapted for use when arranged in one position on the support when no selvage motion is used and when arranged in the opposite position for use when a selvage motion is employed, the other arm of the second lever being provided with a sheave or harness strap pulley carrying a single strap, the pulley being of double strap width so as to be adapted to be reversed in order to locate the strap in one position when five harnesses are used without a selvage motion and in another position when five harnesses are used with a selvage motion, and means for securing the end of the strap running over such sheave to a stationary part of the loom.

5. A harness mechanism for looms having, in combination, a support, a main lever pivoted on the support provided with two arms, one of which carries two sheaves or harness strap pulleys, the other of which carries a second lever pivotally mounted thereon, said second lever having two arms, one of which carries two sheaves or harness strap pulleys and the other of which carries a single sheave or harness strap pulley, straps for the several sheaves or pulleys, and means for securing the end of the strap extended to and around the single sheave or strap pulley on the second lever to a stationary part of the loom.

6. A harness mechanism for looms having, in combination, a lever system comprising a support, a main lever pivotally mounted on the support, a secondary lever pivotally mounted on the main lever, said levers being provided with sheaves for the attachment of harness belts, one of the sheaves having a harness belt extending around it, means for attaching the end of such harness belt to a fixed part of the loom, the sheave over which said strap passes being provided with two strap faces, one of greater diameter than the other, so that the throw of the harness may be increased or decreased by moving the strap from the one to the other of the two strap faces of the sheave.

7. A harness mechanism for looms having, in combination, a support, a main lever pivotally mounted on the support, said main lever having two arms, one of which carries a harness strap sheave, a secondary lever pivotally mounted intermediate its ends upon the other arm of the main lever, harness strap sheaves pivotally mounted at the end of the secondary lever, attaching means mounted on a stationary part of the loom to which a harness strap, passed around one of the sheaves, may be attached, such construction having provision for actuating two, three, four, five or six harnesses.

8. A harness mechanism for looms having, in combination, a support, a main lever pivotally mounted on the support provided with two arms of unequal length, a strap sheave pivotally mounted on the longer arm of the main lever, a secondary lever pivotally mounted on the shorter arm of the main lever intermediate its ends, strap sheaves pivotally mounted on the ends of the secondary lever, and fastening means for securing a strap to a stationary part of the loom adapted to operate the harnesses, one up and five, four, three or two harnesses down.

In testimony whereof I have signed my name to this specification.

CLARE H. DRAPER.